(12) United States Patent
Kang et al.

(10) Patent No.: US 12,120,432 B2
(45) Date of Patent: Oct. 15, 2024

(54) ELECTRONIC DEVICE AND METHOD FOR IMPROVING QUALITY OF IMAGE BY USING MULTIPLE CAMERAS

(71) Applicant: SAMSUNG ELECTRONICS CO., LTD., Suwon-si (KR)

(72) Inventors: Changhoon Kang, Suwon-si (KR); Byounggeun Choi, Suwon-si (KR); Seunghwan Jeong, Suwon-si (KR); Dasom Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 17/986,523

(22) Filed: Nov. 14, 2022

(65) Prior Publication Data

US 2023/0085017 A1    Mar. 16, 2023

Related U.S. Application Data

(63) Continuation of application No. PCT/KR2021/005745, filed on May 7, 2021.

(30) Foreign Application Priority Data

May 14, 2020   (KR) .................. 10-2020-0057772

(51) Int. Cl.
   *H04N 23/73*   (2023.01)
   *G06T 7/80*    (2017.01)

(52) U.S. Cl.
   CPC ............ *H04N 23/73* (2023.01); *G06T 7/80* (2017.01); *G06T 2207/10144* (2013.01); *G06T 2207/30168* (2013.01)

(58) Field of Classification Search
   CPC .... H04N 23/73; H04N 23/685; H04N 23/741; H04N 23/45; H04N 23/00; H04N 23/57;
   (Continued)

(56) References Cited

U.S. PATENT DOCUMENTS

| | | | |
|---|---|---|---|
| 6,977,676 B1 * | 12/2005 | Sato | H04N 23/66 348/E7.086 |
| 8,189,100 B2 | 5/2012 | Li et al. | |

(Continued)

FOREIGN PATENT DOCUMENTS

| | | |
|---|---|---|
| JP | 2013-59026 A | 3/2013 |
| JP | 2016-208242 A | 12/2016 |

(Continued)

OTHER PUBLICATIONS

Written Opinion (PCT/ISA/237) issued Aug. 24, 2021 by the International Searching Authority in International Application No. PCT/KR2021/005745.

(Continued)

*Primary Examiner* — Gevell V Selby

(74) *Attorney, Agent, or Firm* — Sughrue Mion, PLLC

(57) ABSTRACT

An electronic device includes a first camera module; a second camera module; and a processor configured to: perform video shooting by using the first camera module, receive a request to capture a picture image while the video shooting is performed by the first camera module, based on the request to capture the picture image, acquire at least one image frame by using the second camera module, and generate an image corresponding to the request to capture the picture image, based on an image frame acquired by using the first camera module and the at least one image frame acquired by using the second camera module while the video shooting is performed.

16 Claims, 7 Drawing Sheets

(58) Field of Classification Search
CPC ...... H04N 23/667; H04N 23/67; H04N 23/72; H04N 23/80; H04N 23/951; G06T 7/80; G06T 2207/10144; G06T 2207/30168
See application file for complete search history.

(56) References Cited

U.S. PATENT DOCUMENTS

| | | | |
|---|---|---|---|
| 8,547,451 | B2 | 10/2013 | Cho et al. |
| 8,723,978 | B2 | 5/2014 | Kwon et al. |
| 10,082,723 | B2 | 9/2018 | Ikeda |
| 10,136,110 | B2 | 11/2018 | Jung et al. |
| 10,165,194 | B1 | 12/2018 | Baldwin |
| 10,264,181 | B2 | 4/2019 | Watanabe |
| 10,956,774 | B2 | 3/2021 | Kim et al. |
| 2002/0152557 | A1* | 10/2002 | Elberbaum ............ H04N 23/54 348/E7.086 |
| 2008/0024596 | A1* | 1/2008 | Li ........................ H04N 23/57 348/E13.064 |
| 2008/0024614 | A1 | 1/2008 | Li et al. |
| 2008/0030589 | A1 | 2/2008 | Shin et al. |
| 2012/0002065 | A1* | 1/2012 | Park ....................... H04N 23/62 348/220.1 |
| 2016/0037067 | A1 | 2/2016 | Lee et al. |
| 2019/0199905 | A1 | 6/2019 | Choi et al. |
| 2019/0289201 | A1 | 9/2019 | Nishimura et al. |

FOREIGN PATENT DOCUMENTS

| | | |
|---|---|---|
| KR | 10-2005-0056084 A | 6/2005 |
| KR | 10-2008-0013110 A | 2/2008 |
| KR | 10-2017-0046498 A | 5/2017 |
| KR | 10-1816446 B1 | 1/2018 |
| KR | 10-1823256 B1 | 1/2018 |
| KR | 10-2019-0012465 A | 2/2019 |
| WO | 2017/200049 A1 | 11/2017 |
| WO | 2020/008733 A1 | 1/2020 |

OTHER PUBLICATIONS

International Search Report (PCT/ISA/210) issued Aug. 24, 2021 by the International Searching Authority in International Application No. PCT/KR2021/005745.
Communication dated Apr. 18, 2024, issued by the Korean Intellectual Property Office in Korean Application No. 10-2020-0057772.

* cited by examiner

ELECTRONIC DEVICE AND METHOD FOR IMPROVING QUALITY OF IMAGE BY USING MULTIPLE CAMERAS

CROSS-REFERENCE TO RELATED APPLICATIONS

This application is a by-pass continuation application of International Application No. PCT/KR2021/005745, filed on May 7, 2021, which based on and claims priority to Korean Patent Application No. 10-2020-0057772, filed on May 14, 2020, in the Korean Intellectual Property Office, the disclosures of which is incorporated by reference herein in their entireties.

BACKGROUND

1. Field

The disclosure relates to an electronic device and a method for generating an image having improved image quality based on multi-camera module when the image is captured during video shooting.

2. Description of Related Art

A user may take pictures and videos in various ways using an electronic device. For example, a video may be shot in a video shooting mode and a picture may be shot in a picture shooting mode. In addition, a screen displayed on a display may be captured in a screen capture manner while the electronic device is used, for example, for video shooting, or a picture may be shot while video shooting is performed. Particularly, in relation to a method of picture shooting while performing video shooting, a single picture may be captured by using only a camera that is shooting the video. Or shooting the video may be performed using a preview screen.

In addition, in a case that image quality improvement requiring illuminance change, such as High Dynamic Range (HDR), is carried out when picture shooting is performed during video shooting, the illuminance change may affect the video. Thus, in the related art, picture shooting in a video shooting mode was performed without performing illuminance change.

Electronic devices and methods related to image quality improvement when picture shooting is performed during video shooting may include electronic devices and methods for variably determining the number of shots required for synthesis when synthesizing a multi-frame according to shooting environment of a camera and a method in which two cameras are used to capture an image and then a pixel area is determined according to brightness and synthesized.

In the related art, when capturing a picture image by using a camera that is shooting a video, an image quality problem may occur in low-light or backlight conditions. In this case, when illuminance of the camera that is shooting a video is changed for changing illuminance of a picture image, there may be a problem that affects the video, and thus it may be difficult to improve image quality due to the change of illuminance.

Furthermore, in the related art, when capturing a picture image by using a camera that is shooting a video, even if a plurality of frames are synthesized through a single camera, video shooting is affected when configuration of a camera shooting the video is changed.

SUMMARY

According to an aspect of the disclosure, an electronic device includes: a first camera module; a second camera module; and a processor configured to: perform video shooting by using the first camera module, receive a request to capture a picture image while the video shooting is performed by the first camera module, based on the request to capture the picture image, acquire at least one image frame by using the second camera module, and generate an image corresponding to the request to capture the picture image, based on an image frame acquired by using the first camera module and the at least one image frame acquired by using the second camera module while the video shooting is performed.

The processor may be further configured to: based on the request to capture the picture image, determine whether image quality improvement is needed; and based on determining that the image quality improvement is needed, acquire the at least one image frame by using the second camera module.

The processor may be further configured to: determine whether a current configuration value of the second camera module needs to be changed, and based on determining that the current configuration value of the second camera module needs to be changed, change the current configuration value of the second camera module.

The current configuration value may include at least one of an exposure value (EV) and a shooting frame number.

The processor may be further configured to, based on a focus distance of a camera lens of the first camera module and the second camera module being equal to or greater than a threshold value or a phase difference between respective camera lenses of the first camera module and the second camera module being interpolatable when the focus distance is not equal to or larger than a threshold value, generate the image corresponding to the request to capture the picture image, based on the image frame acquired by using the first camera module and the at least one image frame acquired by using the second camera module.

The processor may be further configured to, based on a focus distance of a camera lens of each of the first camera module and the second camera module being less than a threshold value and a phase difference between the respective camera lenses is not interpolated, configure the electronic device to use only a portion of image frame data.

The processor may be further configured to perform image quality improvement of the image frame acquired by using the first camera module and the at least one image frame acquired by using the second camera module while the video shooting is performed.

The processor may be further configured to generate the image corresponding to the request to capture the picture image by synthesizing the image frame acquired by using the first camera module and the at least one image frame acquired by using the second camera module after the image quality improvement is performed.

The processor may be further configured to determine whether the image quality improvement is needed, based on at least one of light saturation data, noise data, illuminance data, color data, and subject data.

The processor may be further configured to, based on the second camera module not being available and a current configuration value of the first camera module needing to be changed, acquire one or more image frames using the first camera module by changing the current configuration value;

and improve quality of the picture image based on the acquired one or more image frames.

The processor may be further configured to, based on synthesis of the acquired one or more image frames having improved image quality being needed, generate the image through synthesis.

According to an aspect of the disclosure, a method for operating an electronic device, the method includes: performing video shooting by using a first camera module of the electronic device; receiving a request to capture a picture image while the video shooting is performed by the first camera module; based on the request to capture the picture image, acquiring at least one image frame by using a second camera module of the electronic device; and generating an image corresponding to the request to capture the picture image, based on an image frame acquired by using the first camera module and the at least one image frame acquired by using the second camera module during the video shooting.

The method may further include: based on the request to capture the picture image, determining whether image quality improvement is needed; and based on determining that the image quality improvement is needed, acquiring the at least one image frame by using the second camera module.

The method may further include based on a current configuration value of the second camera module needing to be changed, changing the current configuration value of the second camera module.

The current configuration value may include at least one of an exposure value (EV) and a shooting frame number.

The method may further include, based on a focus distance of a camera lens of each of the first camera module and the second camera module being less than a threshold value or a phase difference between the respective camera lenses being interpolatable when the focus distance is less than a threshold value, generating an image corresponding to the request to capture the picture image, based on the image frame acquired by using the first camera module and the at least one image frame acquired by using the second camera module.

The method may further include, based on a focus distance of a camera lens of each of the first camera module and the second camera module being less than a threshold value and a phase difference between respective camera lenses not being interpolated, configuring the electronic device to use only a portion of image frame data.

According to various embodiments disclosed herein, a picture having enhanced image quality may be obtained without influence on a video through multi frame composition using two or more camera modules when capturing a picture during video shooting from an electronic device having multiple camera modules.

According to various embodiments of the present disclosure, by using the capability of exposure configuration for each of multiple camera modules, video shooting may be performed differently by configuring two or more camera modules during the video shooting, and multiple captured images may be efficiently used, so that a picture having enhanced quality may be obtained without influence on the video.

It will be appreciated by a person skilled in the art that the effects of the disclosure, which may be achieved based on various embodiments, are not limited to the effects described above and other effects that are not described above will be clearly understood from the following detailed description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
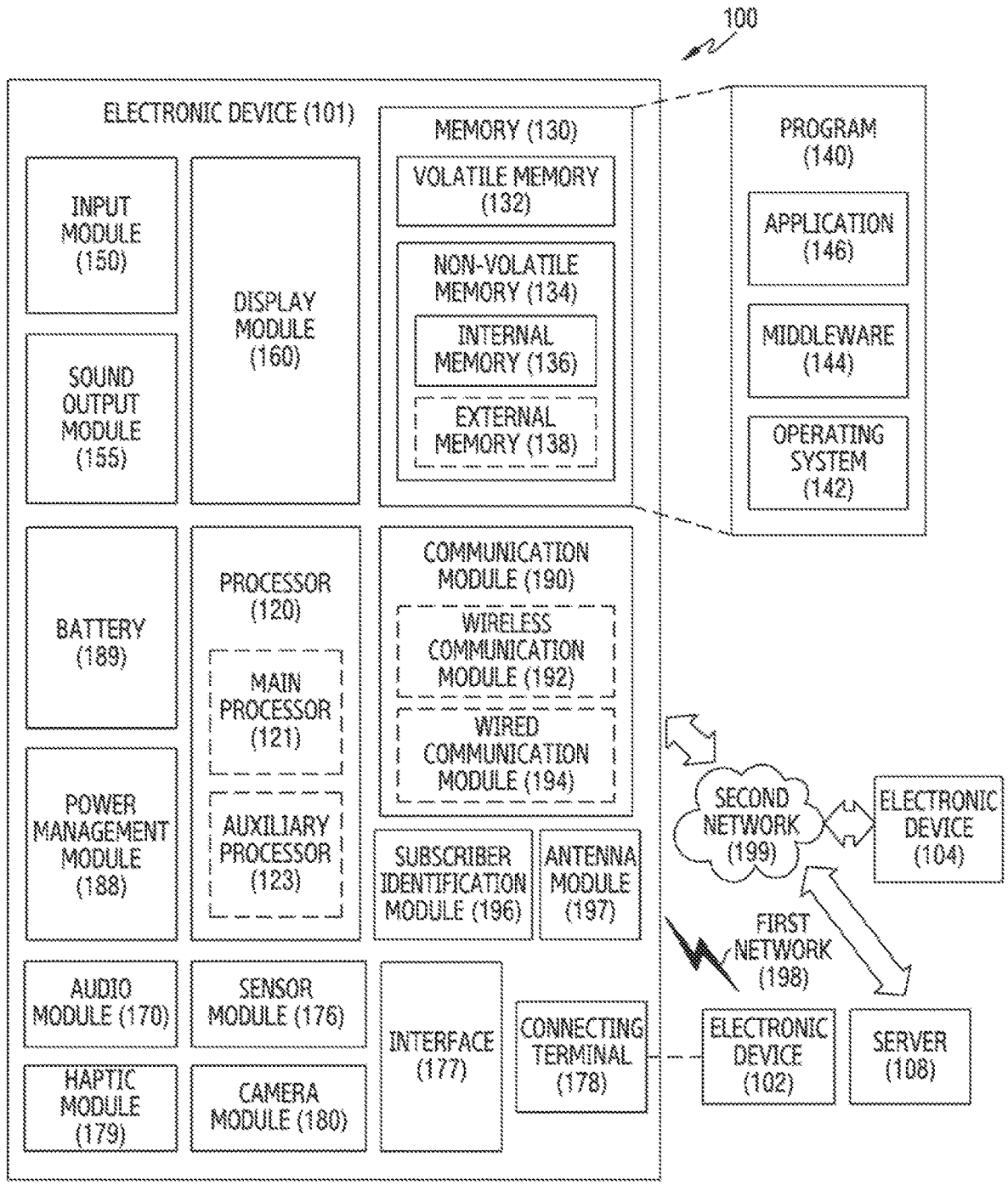
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in a display (e.g., the display device 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., using a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., using a wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a universal serial bus (USB) connector, a secure digital (SD) card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image (a photo image) or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetoot™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
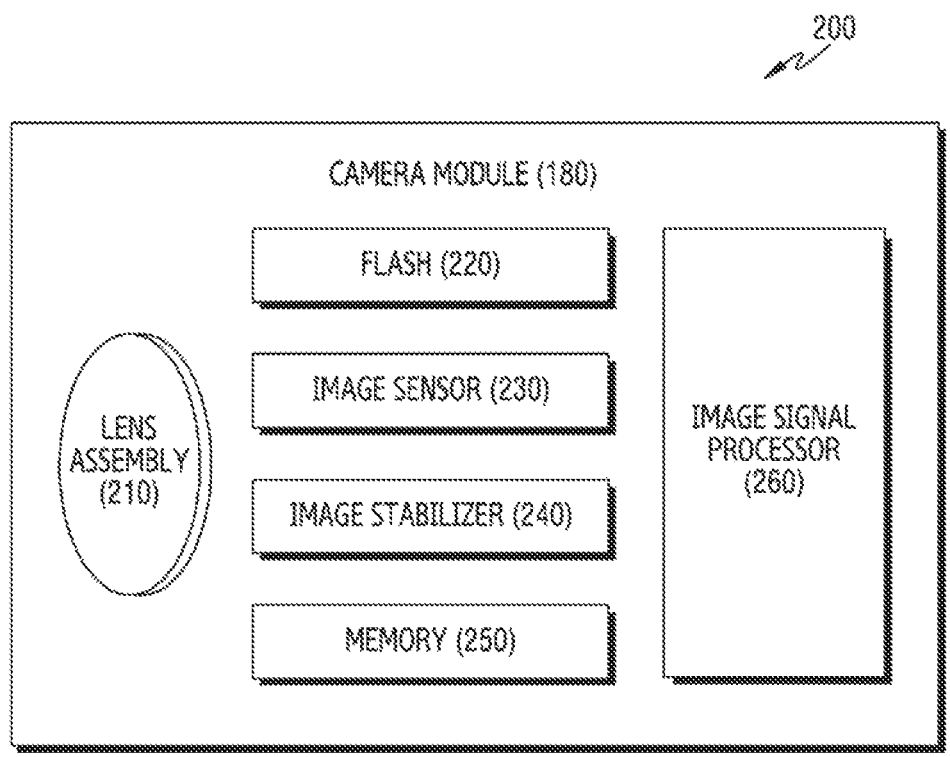
FIG. 2 is a block diagram illustrating a camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
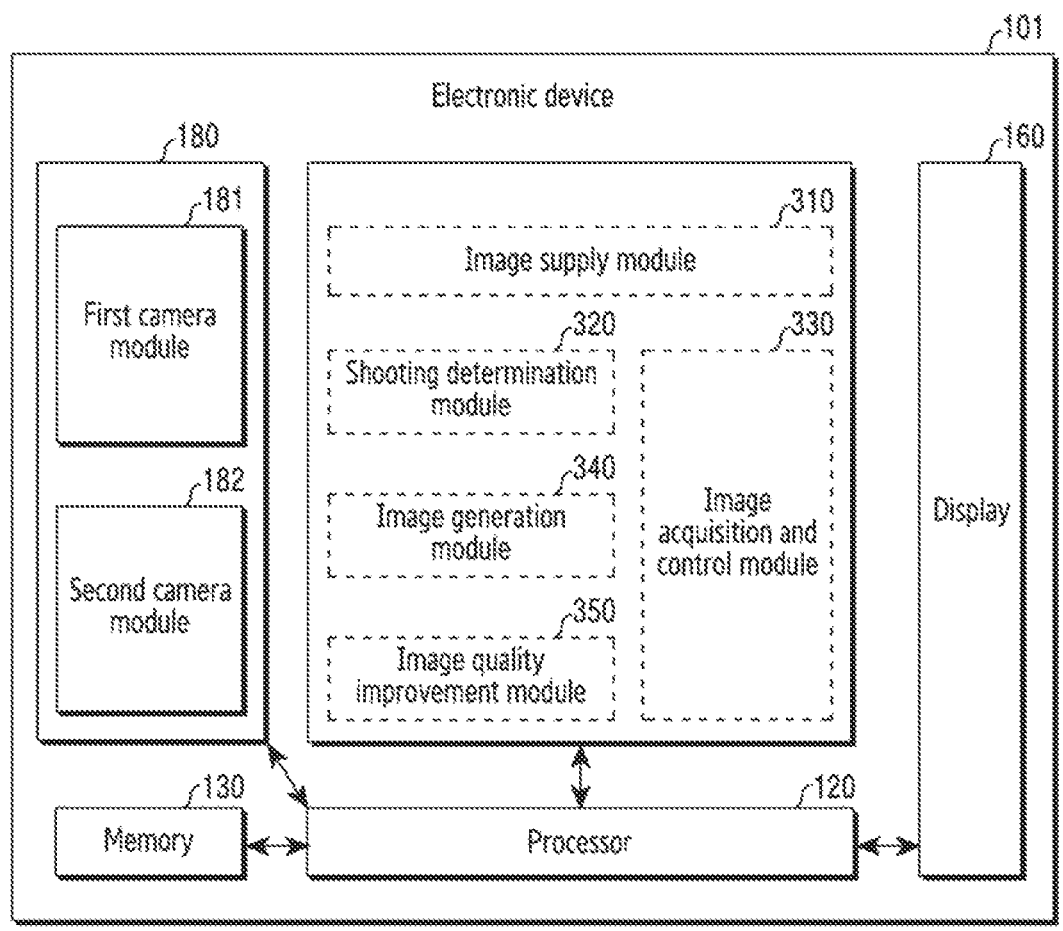
FIG. 3 is a simplified diagram illustrating a configuration of an electronic device according to an embodiment.

FIG. 3 illustrates a configuration of an electronic device according to an embodiment.

In an embodiment, referring to FIG. 3, the electronic device 101 may include a processor 120, a memory 130, a display (or a display device) 160, and a camera module 180. In addition, for example, the camera module 180 may include a first camera module 181 and a second camera module 182. For example, the first camera module 181 includes the first lens assembly, the first flash, the first image sensor, the first image stabilizer, the first memory, and the first image signal processor, as illustrated in FIG. 2. Likewise, the second camera module 182 includes the second set of those components illustrated in FIG. 2. Throughout the present disclosure, the first camera module 181 and the second camera module 182 may be collectively referred to as a multi-camera module.

The processor 120, the memory 130, the display 160, and the camera module 180 according to various embodiments may perform the functions and operations described above with reference to FIG. 1. In addition, the memory 130, the display 160, and the camera module 180 may perform the functions and operations described above with reference to FIG. 1 under the control of the processor 120.

The electronic device 101 according to various embodiments may further include components (e.g., the components of the electronic device 101 described with reference to FIG. 1) which are not described in FIG. 3.

The electronic device 101 according to an embodiment may include an image supply module 310, a shooting determination module 320, an image acquisition and control module 330, an image generation module 340, and an image quality improvement module 350.

The image supply module 310, the shooting determination module 320, the image acquisition and control module 330, the image generation module 340, and the image quality improvement module 350 of the electronic device 101 according to various embodiments may be controlled by the processor 120.

In an embodiment, according to control of the processor 120, the image supply module 310 may transfer a configuration value (e.g., a camera configuration value) to the camera module 180 or receive an image acquired by the camera module 180 according to a configuration value. The camera configuration value may include, for example, meta data (e.g., a focus distance, a shutter speed, camera sensitivity (international standard organization (ISO)), white balance, scene information, zoom information) required for shooting, a shooting frame number, a shooting frame size, an image format, an exposure value (EV), a frame requiring a configuration change, and the like.

In an embodiment, according to control of the processor 120, the image supply module 310 may transfer an image acquired by the camera module 180 during video shooting, capturing, or recording (in a video shooting mode) to the display 160 and the image generation module 340. For example, according to control of the processor 120, the electronic device 101 may assign a display (e.g., the display 160) stream and an image generation module (e.g., the image generation module 340) stream to the first camera module 181 (and/or the second camera module 182), and the first camera module 181 (and/or the second camera module 182) may transfer an acquired image to the display 160 and the image generation module 340 by using the streams.

In an embodiment, an EV of the camera configuration value may be a value for adjusting brightness of an image at the same illuminance by using a shutter speed and camera sensitivity. For example, when an EV of the camera configuration value is configured to (+), the electronic device 101 may acquire an image brighter than that of a case in which an EV is configured to 0 by using the camera module 180. In addition, when an EV of the camera configuration value is configured to (−), the electronic device 101 may acquire an image darker than that of a case in which an EV is configured to 0 by using the camera module 180. For another example, when an EV of the camera configuration value is configured to 0, the electronic device 101 may acquire an image in which an EV is configured to 0 by using the camera module 180 and transfer images in which the EV is configured to 0 to the display 160 and/or the image generation module 340 through each stream (e.g., a display (160) stream and/or an image generation module 340 stream). In addition, the electronic device 101 may determine an EV according to control of the processor 102 in consideration of a time required for changing an EV during multi frame shooting and image quality improvement algorithm and the like.

In various embodiments, according to control of the processor 120, the electronic device 101 may use images acquired with various EVs for improving brightness or image quality of images and improvements may be possible for underexposed and overexposed areas in an image. The detailed description of image quality improvement will be given in the following.

In an embodiment, when an input (or a command) of a user for requiring a picture shooting (or a picture image shooting) is received, the shooting determination module 320 may transfer the input of the user to the image acquisition and control module 330 according to control of the processor 120. For example, when a user inputs a request to capture a picture image during video shooting by using the electronic device 101, the electronic device 101 may receive a user input (e.g., the request to capture a picture image) through the shooting determination module 320, and then the shooting determination module 320 may transfer the user input to the image acquisition and control module 330 according to control of the processor 120.

In another embodiment, the electronic device 101 may determine whether an image acquired by using the shooting determination module 320 needs to be improved in image quality, according to control of the processor 120, and may determine a camera configuration value and an operation of improving image quality based on illuminance and a surrounding environment according to availability of the multi-camera module (e.g., the first camera module 181 and the second camera module 182 as illustrated in FIG. 3). For example, when it is determined that HDR shooting is needed while capturing a picture image during video shooting with one camera module (e.g., the first camera module 181) according to control of the processor 120, the shooting determination module 320 of the electronic device 101 may determine a camera configuration value such as an EV and a shooting frame number of a camera module (e.g., the second camera module 182) that is not used for outputting to the display 160 and the image generation module 340.

In an embodiment, the image acquisition and control module 330 of the electronic device 101 may determine a camera configuration value, a shooting frame number, and the like, based on data (e.g., light saturation data, noise data, illuminance data, color data, and subject data) received from the image supply module 310 according to control of the processor 120. Furthermore, the image acquisition and control module 330 may acquire images by controlling the image supply module 310 based on the camera configuration value and the shooting frame number determined according to control of the processor 120. For example, the image acquisition and control module 330 may configure the shooting frame number as four (4) and an EV of a first frame and a third frame of the four frames (e.g., a first frame to a fourth frame) as −2, based on at least one of data (e.g., light saturation data, noise data, illuminance data, color data, and subject data) received from the image supply module 310. Here, the image acquisition and control module 330 of the electronic device 101 may perform shooting of four frames according to control of the processor 120, based on the above-described configuration, and transfer acquired images (e.g., images of four frames) to the image quality improvement module 350.

In an embodiment, the image generation module 340 of the electronic device 101 may generate an image by using images (or frames) acquired from the image supply module 310 according to control of the processor 120. For example, the image generation module 340 of the electronic device 101 may acquire images from the image supply module 310 and generate a video by using the images according to control of the processor 120.

In an embodiment, the image quality improvement module 350 of the electronic device 101 may perform image quality improvement and generate improved images by using the acquired images and information transferred from the image acquisition and control module 330 according to control of the processor 120. The image quality improvement module 350 of the electronic device 101 may store the improved images (with improved image quality) in the memory 130 according to control of the processor 120. For example, when information of HDR synthesis and the acquired images are received from the image acquisition and control module 330, the image quality improvement module may perform an operation of improving image quality (e.g., image quality improvement based on multi frame synthesis or image quality improvement based on a single frame) and generate and store improved images with improved image quality. For another example, the image quality improvement module 350 may perform background processing and synchronization method processing in real time according to control of the processor 120.

Figure 4:
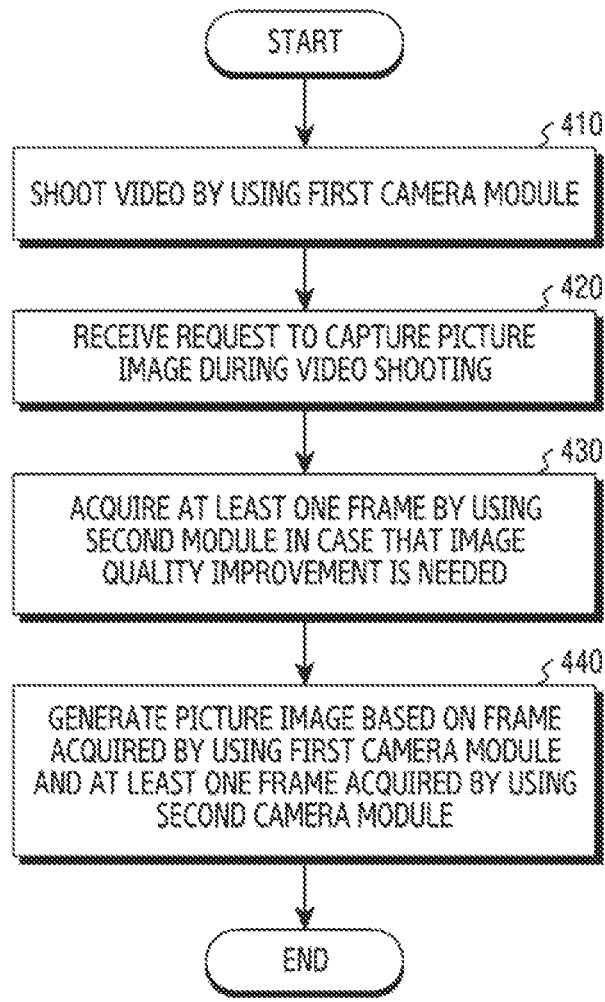
FIG. 4 is a flowchart illustrating a method of generating an image having improved image quality by using a multi-camera module in an electronic device according to an embodiment.

FIG. 4 illustrates a flowchart of a method of generating an image having enhanced image quality by using a multi-camera module in an electronic device according to an embodiment.

According to an embodiment, in operation 410, the electronic device 101 may perform video shooting by using the first camera module 181.

In an embodiment, the electronic device 101 may perform video shooting by using the first camera module 181 of the multiple camera modules (e.g., the first camera module 181 and the second camera module 182) according to control of the processor 120. The electronic device 101 may acquire multiple images (or frames) by using the first camera module 181 while performing video shooting according to control of the processor 120.

In an embodiment, the electronic device 101 may identify a usage state or a physical condition (e.g., heat) of the memory 130 while performing video shooting according to control of the processor 120. The electronic device 101 may refer to the identified usage state or the physical condition of the memory 130 for an operation of capturing a picture image.

According to an embodiment, in operation 420, the electronic device 101 may receive a request to capture a picture image during video shooting.

In an embodiment, the electronic device 101 may receive a user request to capture a picture image, for example, through the shooting determination module 320 according to control of the processor 120. The electronic device 101 may transfer the user request (or input) received by the shooting determination module 320 to the image acquisition and control module 330 according to the control of the processor 120.

According to an embodiment, in the operation 430, the electronic device 101 may acquire at least one frame by using the second camera module 182 when image quality improvement is needed.

In an embodiment, the electronic device 101 may determine whether image quality improvement is needed according to control of the processor 120. For example, the electronic device 101 may determine whether image quality improvement is needed according to control of the processor 120 by using the image acquisition and control module 330, based on data (e.g., light saturation data, noise data, illuminance data, color data, and subject data) received from the image supply module 310.

In another embodiment, the electronic device 101 may receive a request to capture a picture image during video shooting and determine whether image quality improvement is needed. Here, the electronic device 101 may acquire a picture image by capturing one frame by using the first camera module 181 which is shooting a video.

In an embodiment, in a case that the electronic device 101 determines that image quality improvement is needed, when a multi-camera module is available, the electronic device 101 may acquire at least one frame by using the second camera module 182 distinguished from the first camera module 181 that is shooting a video according to control of the processor 102. For example, the first camera module 181 may be shooting a video, while the second camera module 182 may not be shooting a video. The electronic device 101 may have assigned a display (e.g., the display 160) stream and an image generation module (e.g., the image generation module 340) stream to the first camera module 181 but have not assigned streams to the second camera module 182 according to control of the processor 120. The electronic device 101 may acquire at least one frame using the second camera module 182 according to control of the processor 120, based on a camera configuration value (e.g., an EV and the number of frames) different from that of the first camera module 181 according to control of the processor 120.

According to an embodiment, in operation 440, the electronic device 101 may generate an image based on a frame acquired by using the first camera module 181 and at least one frame acquired by using the second camera module 182.

In an embodiment, the electronic device 101 may perform image quality improvement and synthesis according to control of the processor 120, based on (a) a frame acquired by using the first camera module 181 during video shooting and (b) at least one frame acquired by using the second camera module 182 that is not shooting a video.

In an embodiment, the electronic device 101 may generate a picture image required by a user by using frames (e.g., a frame acquired by using the first camera module 181 during video shooting and at least one frame acquired by using the second camera module 182 not shooting a video) in which image quality improvement and synthesis have been performed.

A detailed description with respect to the operation 410 to the operation 440 according to an embodiment will be given with reference to FIGS. 5 to 7.

Figure 5:
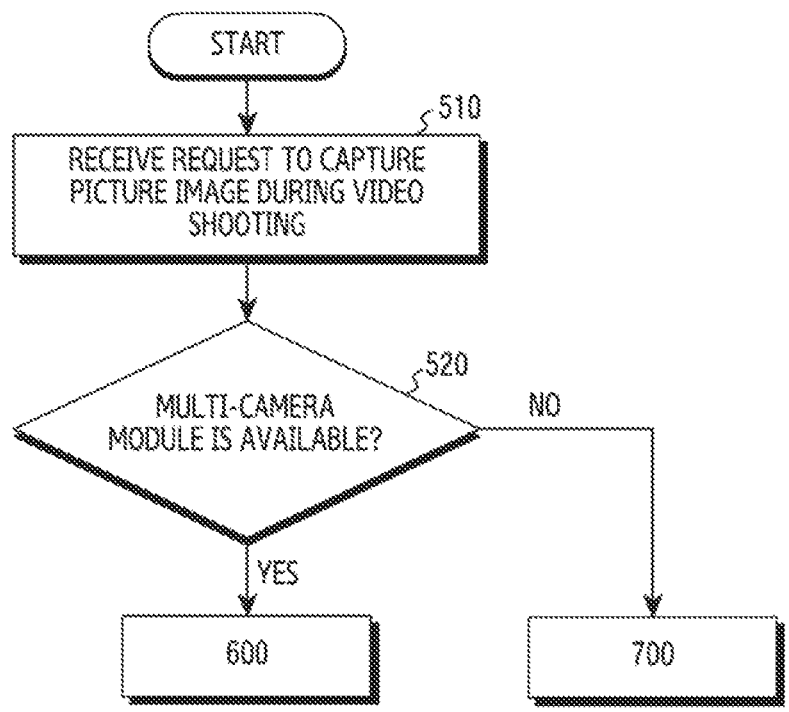
FIG. 5 is a flowchart illustrating operations according to whether a multi-camera module is used in an electronic device according to an embodiment.

FIG. 5 illustrates operations according to whether a multi-camera module is used in an electronic device according to an embodiment.

According to an embodiment, in operation 510, the electronic device 101 may receive a request to capture a picture image during video shooting. Operation 510 may be identical or similar to operation 420 described with reference to FIG. 4.

According to an embodiment, in operation 520, the electronic device 101 may determine whether the multi-camera module (e.g., the first camera module 181 and the second camera module 182) is available.

In an embodiment, when a user request to capture a picture image is received, the electronic device 101 may determine whether the multi-camera module is available for improving image quality. For example, the electronic device 101 may be shooting a video by using the first camera module 181 according to control of the processor 120. When a user request to capture a picture image is received, the electronic device 101 may determine whether the second camera module 182 is available according to control of the processor 120 when image quality improvement is needed.

Figure 6:
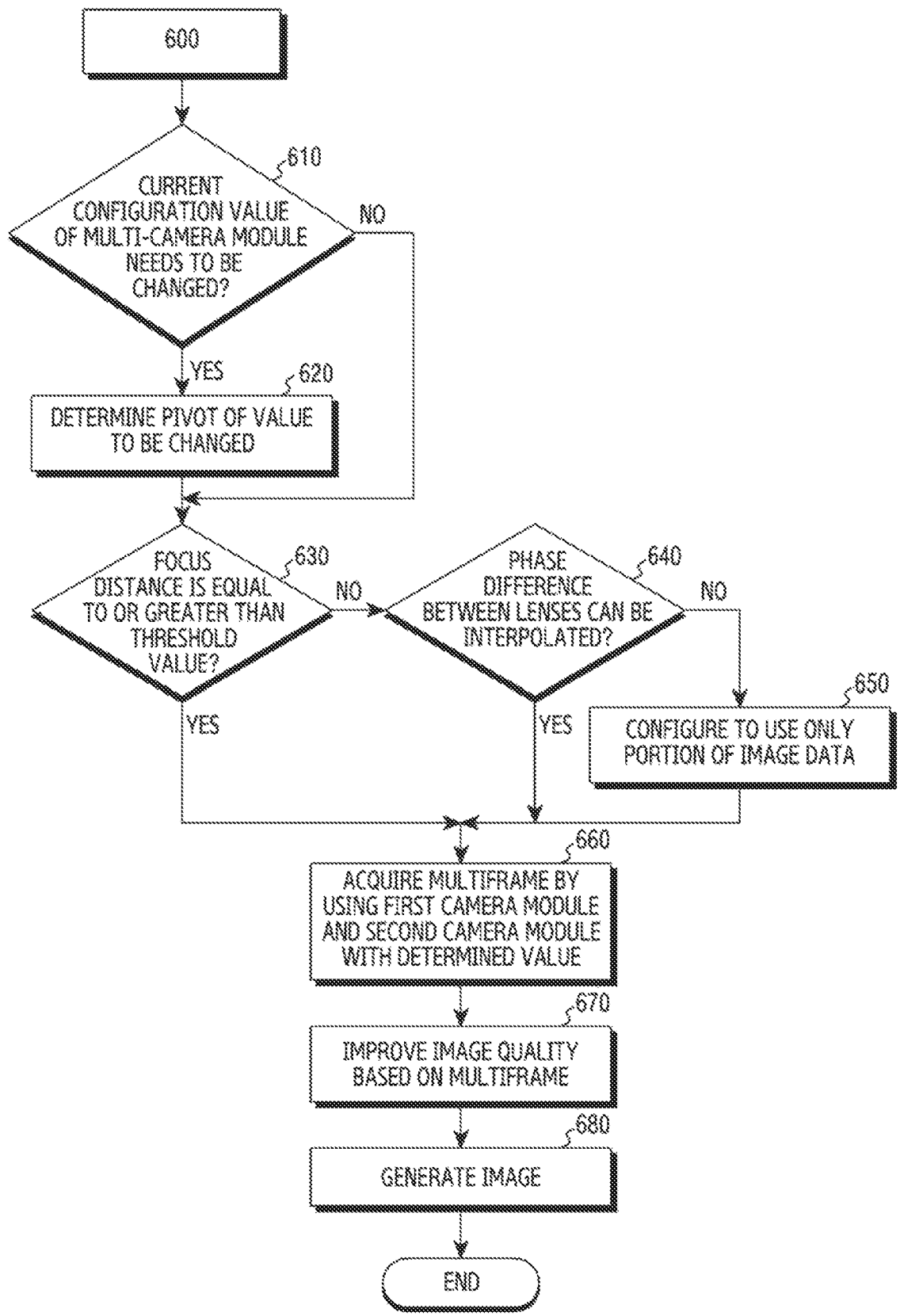
FIG. 6 is a flowchart illustrating operations when a multi-camera module is available in an electronic device according to an embodiment.
Figure 7:
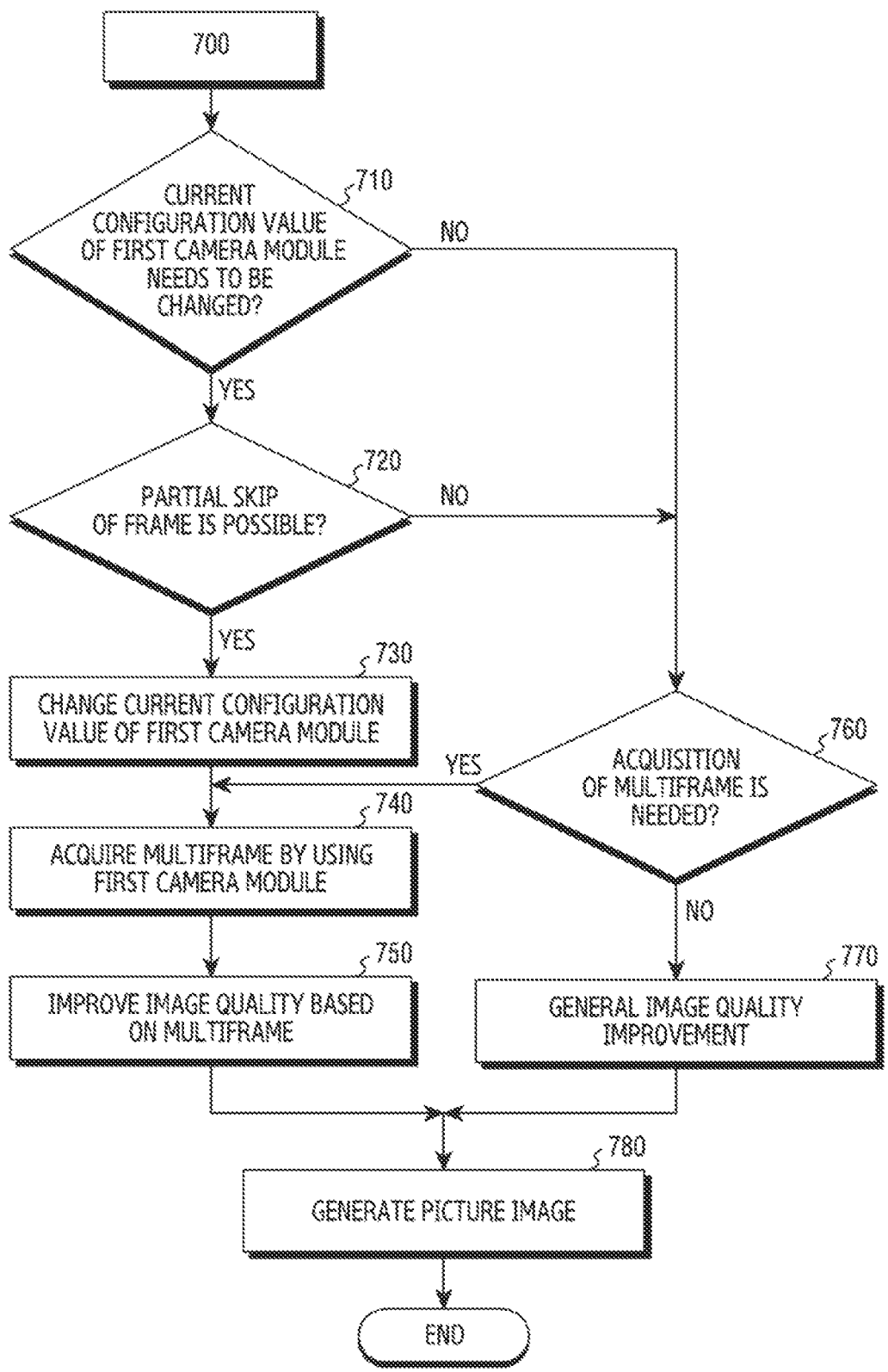
FIG. 7 is a flowchart illustrating operations when a multi-camera module is not used in an electronic device according to an embodiment.

In an embodiment, the electronic device 101 may perform, when the multi-camera module is available, an operation 600 of improving image quality based on the multi-camera module (see FIG. 6) and may perform, when the multi-camera module is not available, an operation 700 of improving image quality based on a single camera module (see FIG. 7).

FIG. 6 illustrates operations when a multi-camera module is available in an electronic device according to an embodiment.

According to an embodiment, in operation 610, the electronic device 101 may determine whether a current configuration value of the multi-camera module (i.e., the second camera module 182) needs to be changed. For example, the electronic device 101 may determine whether a camera configuration value (e.g., an EV, the number of shooting frames, and a frame requiring configuration change) of the second camera module 182 needs to be changed according to control of the processor 120. The electronic device 101 may configure whether a camera configuration value needs to be changed to suit a condition or environment, based on data (e.g., light saturation data, noise data, illuminance data, color data, and subject data) according to control of the processor 120. For a specific example, the electronic device 101 may determine, according to control of the processor 120, that the number of shooting frames is needed to be changed by four frames, and an EV of a fourth frame among the four frames (e.g., a first frame to a fourth frame) is needed to be changed by −4. In addition, the electronic device 101 may determine, according to control of the processor 120, that an EV of a first frame, a second frame, or a third frame among four frames (e.g., a first frame to a fourth frame) is needed to be changed by −4. The number of shooting frames (e.g., four frames), the frame requiring configuration change (e.g., the first frame, the second frame, the third frame, or the fourth frame), a degree of change (e.g., changing an EV by −4) may be not limited to the above-described example.

In an embodiment, when it is determined that the current configuration value of the multi-camera module needs to be changed (610—YES), the electronic device 101 may determine a pivot of a configuration value to be changed in operation 620. Alternatively, when it is determined that the current configuration value of the multi-camera module does not need to be changed (610—NO), the electronic device 101 may skip operation 620 and proceed to operation 630.

An embodiment for the operation of determining a pivot related to the current configuration value change by the electronic device 101 according to control of the processor 102 will be described with reference to Table 1 below.

TABLE 1

| mode | view angle | frame 1 | frame 2 | frame 3 | frame 4 |
|---|---|---|---|---|---|
| preview | Wide | C | C | C | C |
| video | Wide | C | C | C | C |
| picture | Wide | C | C | C | C |
|  | ultra-wide | C | C | C | C − 4 |

Referring to Table 1 above, the electronic device 101 may include the first camera module 181 having a wide angle and the second camera module 182 having an ultra-wide angle distinguished from the first camera module 181 for shooting a preview, a video, and a picture. In Table 1 above, C may indicate a currently configured EV, and C−4 may indicate an EV changed by −4 from C.

In an embodiment, the electronic device 101 may have determined, according to control of the processor 120, that the number of shooting frames is needed to be changed by four frames, and an EV of a fourth frame among the four frames (a first frame to a fourth frame) is needed to be changed by −4. Here, in the operation 620, the electronic device 101 may determine a pivot for changing an EV of the fourth frame among four frames acquired by the second camera module 182 having an ultra-wide angle by −4 according to control of the processor 120.

In another embodiment, unlike what is shown in Table 1, the electronic device 101 may determine that EVs of the fourth frame among the four frames (e.g., the first frame to the fourth frame) and one of the other frames (e.g., the first frame, the second frame, or the third frame) are needed to be changed by −4, and determine a pivot for changing the EVs of the fourth frame and one of the other frames (e.g., the first frame, the second frame, or the third frame) by −4 according to control of the processor 120. In addition, the electronic device 101 may determine a pivot for changing EVs of two or more frames as well as one frame among four frames (e.g., the first frame to the fourth frame) according to control of the processor 120.

According to various embodiments, in determining a pivot for changing a configuration value of the electronic device 101, the number of shooting frames (e.g., four frames), the frame requiring configuration change (e.g., the first frame, the second frame, the third frame, or the fourth frame), a degree of change (e.g., changing an EV by −4) shown in Table 1 may be merely one example and may be not limited to the above-described embodiment.

Next, in operation 630, the electronic device 101 may determine whether a focus distance of a lens of the multi-camera module is equal to or greater than a threshold value, according to control of the processor 120. For example, the focus distance may be a distance to a subject in focus and may be distinguished from a focal length indicating a distance between a lens and a point where an image is formed. For a specific example, as the focus distance is closer, a distance between a lens of a camera module and a subject in focus may be shorter, and as the focus distance is greater, a distance between a lens of a camera module and a subject in focus may be greater.

In an embodiment, the electronic device 101 may acquire an image having a large phase difference as distances of multiple lenses in the multi-camera module are shorter, and here, it may be difficult to improve and synthesize image quality based on multi-frames. For example, the electronic device 101 may determine whether a focus distance of each lens of the first camera module 181 and the second camera module 182 is equal to or larger than a threshold value.

In an embodiment, the electronic device 101 may perform the operation 660 when a focus distance of the multi-camera module is equal to or larger than a threshold value (630—YES) and perform operation 640 when a focus distance of the multi-camera module is less than a threshold value (630—NO).

According to an embodiment, in the operation 640, the electronic device 101 may determine whether a phase difference between lenses of each camera module (e.g., the first camera module 181 and the second camera module 182) of the multi-camera module may be interpolated according to control of the processor 120.

In an embodiment, the electronic device 101 may perform the operation 660 when a phase difference between respective lenses of the multi-camera module can be interpolated (640—YES), and perform the operation 650 when a phase difference between respective lenses of the multi-camera module cannot be interpolated (640—NO). For example, the electronic device 101 may perform operation 660 when a phase difference between lenses of each camera module (e.g., the first camera module 181 and the second camera module 182) may be interpolated even if a focus distance of each camera module is less than a threshold value.

According to an embodiment, in operation 650, the electronic device 101 may be configured to use only a portion of acquired image data. For example, the electronic device 101 may be configured to use, for improving image quality, only partial data with saturated light, partial data without noise, and partial data with high illuminance among acquired image data (e.g., frame data) according to control of the processor 120. For another example, the electronic device 101 may be configured to use partial data corresponding to the y-axis having a relatively small phase difference among acquired image data (e.g., frame data) according to control of the processor 120 when a phase difference is large with reference to the x-axis.

According to an embodiment, in the operation 660, the electronic device 101 may acquire a multi-frame by using the first camera module 181 and the second camera module 182. For a specific example, in the operation 620, the electronic device 101 may have configure the number of shooting frames to be changed to four frames, and an EV of a fourth frame among the four frames (e.g., a first frame to a fourth frame) to be changed by −4, according to control of the processor 120. The electronic device 101 may acquire four frames (e.g., all EVs of a first frame to a fourth frame are C) by using the first camera module 181 having a wide angle and acquire four frames (e.g., EVs of a first frame to a third frames are C and an EV of a fourth frame is C−4) by using the second camera module 182 having an ultra-wide angle.

According to an embodiment, in the operation 670, the electronic device 101 may perform image quality improvement based on the multi-frame.

In an embodiment, the electronic device 101 may perform image quality improvement by replacing the fourth frame having the EV of C and acquired by using the first camera module 181 having a wide angle with the fourth frame having the EV of C−4 among four frames (e.g., EVs of the first frame to the third frames are C and an EV of the fourth frame is C−4) acquired by using the second camera module 182 having an ultra-wide angle according to control of the processor 120.

In another embodiment, the operation of performing image quality based on a multi-frame by the electronic device 101 will be described with reference to Table 2. Referring to Table 2 below, the electronic device 101 may include the first camera module 181 having a wide angle and the second camera module 182 having an ultra-wide angle distinguished from the first camera module 181 for shooting a preview, a video, and a picture. In Table 1 above, C may indicate a currently configured EV, and C−4 may indicate an EV changed by −4 from C.

TABLE 2

| mode | view angle | frame 1 | frame 2 | frame 3 | frame 4 |
| --- | --- | --- | --- | --- | --- |
| preview | Wide | C | C | C | C |
| video | Wide | C | C | C | C |
| picture | Wide | — | — | — | — |
|  | ultra-wide | C | C | C | C − 4 |

Referring to Table 2, when the second camera module 182 has higher image quality and resolution than the first camera module 181 that is shooting a video, the electronic device 101 may improve image quality by performing shooting only using the second camera module 182 according to control of the processor 120. For example, the electronic device 101 may perform image quality improvement by replacing all frames having an EV of C and acquired by using the first camera module 181 having a wide angle with four frames (e.g., EVs of the first frame to the third frames are C and an EV of the fourth frame is C−4) acquired by using the second camera module 182 having an ultra-wide angle.

In another embodiment, unlike what is shown in Table 2, it may be determined that EVs of the fourth frame among the four frames (e.g., the first frame to the fourth frame)

acquired by using the second camera module 182 having an ultra-wide angle and one of the other frames (e.g., the first frame, the second frame, or the third frame) are needed to be changed by −4, and a pivot for changing the EVs of the fourth frame and one of the other frames (e.g., the first frame, the second frame, or the third frame) by −4 may be determined. In addition, the electronic device 101 may determine a pivot for changing EVs of two or more frames as well as one frame among four frames (e.g., the first frame to the fourth frame) acquired by using the second camera module 182 having an ultra-wide angle according to control of the processor 120. The electronic device 101 may perform image quality improvement by replacing all four frames having an EV of C and acquired by using the first camera module 181 with four frames acquired by using the second camera module 182 having an ultra-wide angle.

According to various embodiments, in determining a pivot for changing a configuration value of the electronic device 101, the number of shooting frames (e.g., four frames), the frame requiring configuration change (e.g., the first frame, the second frame, the third frame, or the fourth frame), a degree of change (e.g., changing an EV by −4) shown in Table 2 may be merely one example and may be not limited to the above-described embodiment.

According to an embodiment, in operation 670, the electronic device 101 may perform the operation of improving image quality based on the multi-frame. The electronic device 101 may additionally perform general image quality improvement in addition to the operation of improving image quality based on the multi-frame. That is, the general image quality improvement may be optional.

According to an embodiment, in the operation 680, the electronic device 101 may generate a picture image. For example, the electronic device 101 may perform image quality improvement based on a multi-frame acquired by using the multi-camera module (e.g., the first camera module 181 and the second camera module 182) according to control of the processor 120 and generate a picture image required by a user by synthesizing the image quality-improved frames.

FIG. 7 illustrates operations when a multi-camera module is not used in an electronic device according to an embodiment.

According to an embodiment, in the operation 710, the electronic device 101 may determine whether a current configuration value of the first camera module 181 is needed to be changed. For example, the electronic device 101 may determine whether a camera configuration value (e.g., an EV, the number of shooting frames, and a frame requiring configuration change) of the first camera module 181 is needed to be changed according to control of the processor 120. The electronic device 101 may configure whether a camera configuration value is needed to be changed to suit a condition or environment, based on data (e.g., light saturation data, noise data, illuminance data, color data, and subject data).

In an embodiment, when the current configuration value of the first camera module 181 needs to be changed (710—YES), the electronic device 101 may perform operation 720. Alternatively, when a current configuration value of the first camera module 181 does not need to be changed (710—NO), the electronic device may perform operation 760.

According to an embodiment, in operation 720, the electronic device 101 may determine whether a partial skip of a frame is possible. For example, the electronic device 101 may omit a frame requiring a change in a current configuration value according to control of the processor 120 and acquire a frame having improved image quality by excluding the frame requiring improvement.

In an embodiment, when a portion of a frame can be skipped or omitted (720—YES), the electronic device 101 may perform the operation 730. Alternatively, when a portion of a frame cannot be skipped or omitted (720—NO), the electronic device 101 may perform operation 760.

According to an embodiment, in operation 730, the electronic device 101 may change a current configuration value of the first camera module 181. For example, in the operation 710, the electronic device 101 may change a current configuration value of the first camera module according to control of the processor 120 when it is determined that a current configuration value is needed to be changed.

According to an embodiment, in operation 760, the electronic device 101 may determine whether acquisition of a multi-frame is needed. For example, the electronic device 101 may determine that acquisition of a multi-frame is not required according to control of the processor 120 when brightness (or illuminance) is equal to or greater than a threshold value. Furthermore, the electronic device 101 may determine that acquisition of a multi-frame is not required according to control of the processor 120 when it is determined that multi-frame-based image quality improvement is not required even if brightness (or illuminance) is equal to or greater than a threshold value. For another example, the electronic device 101 may determine that low-illuminance shooting is needed when brightness (or illuminance) is less than a threshold value and determine that acquisition of a multi-frame is needed according to control of the processor 120.

In an embodiment, when acquisition of a multi-frame is needed (760—YES), the electronic device 101 may perform operation 740. Alternatively, when acquisition of a multi-frame is not required (760—NO), the electronic device may perform operation 770. According to an embodiment, in operation 770, the electronic device 101 may perform general image quality improvement.

According to an embodiment, in an operation 740, the electronic device 101 may acquire a multi-frame by using the first camera module 181.

TABLE 3

| mode | view angle | frame 1 | frame 2 | frame 3 | frame 4 |
|---|---|---|---|---|---|
| preview | Wide | C | C | C | C |
| video | Wide | C | C | C | C |
| picture | Wide | C | C | C | C |
|  | ultra-wide | — | — | — | — |

In an embodiment, referring to Table 3 above, the electronic device 101 may include the first camera module 181 having a wide angle and the second camera module 182 having an ultra-wide angle distinguished from the first camera module 181 for preview and shooting a video and a picture. As shown in Table 3, the electronic device 101 may acquire a multi-frame by using only the first camera module 181 according to control of the processor 120 and the second camera module 182 may not be involved in acquisition of a multi-frame. For example, the electronic device 101 may acquire a multi-frame of four frames by using only the first camera module 181 according to control of the processor 120.

According to an embodiment, in the operation 750, the electronic device 101 may perform image quality improvement based on the multi-frame.

According to an embodiment, in operation 780, the electronic device 101 may generate a picture image according to control of the processor 120. For example, the electronic device 101 may perform image quality improvement based on a multi-frame according to the operation 750 or perform image quality improvement based on a single frame according to the operation 770 and may generate a picture image corresponding to a user request according to control of the processor 120.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via a wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a first camera module;
   a second camera module;
   a processor; and
   memory storing instructions that, when executed by the processor, cause the electronic device to:
   perform video shooting by using the first camera module,
   receive a request to capture a picture image while the video shooting is performed by the first camera module,
   determine whether a current configuration value of the second camera module needs to be changed, wherein the current configuration value of the second camera module comprises at least one of an exposure value (EV) or a shooting frame number,
   based on determining that the current configuration value of the second camera module needs to be changed, change the current configuration value of the second camera module,
   based on the request to capture the picture image, acquire at least one image frame by using the second camera module of which the current configuration value is changed, and generate an image corresponding to the request to capture the picture image, based on an image frame acquired by using the first camera module and the at least one image frame acquired by using the second camera module while the video shooting is performed.

2. The electronic device of claim 1, wherein the instructions, when executed by the processor, further cause the electronic device to:
based on the request to capture the picture image, determine whether image quality improvement is needed, and
based on determining that the image quality improvement is needed, acquire the at least one image frame by using the second camera module.

3. The electronic device of claim 1, wherein the instructions, when executed by the processor, further cause the electronic device to, based on a first focus distance of a first camera lens of the first camera module and a second focus distance of a second camera lens of the second camera module being equal to or greater than a threshold value or a phase difference between the first camera lens of the first camera module and the second camera lens of the second camera module being interpolatable when the first focus distance and the second focus distance are not equal to or larger than the threshold value, generate the image corresponding to the request to capture the picture image, based on the image frame acquired by using the first camera module and the at least one image frame acquired by using the second camera module.

4. The electronic device of claim 1, wherein the instructions, when executed by the processor, further cause the electronic device to, based on a focus distance of a camera lens of each of the first camera module and the second camera module being less than a threshold value and a phase difference between the respective camera lenses is not interpolated, configure the electronic device to use only a portion of image frame data.

5. The electronic device of claim 1, wherein the instructions, when executed by the processor, further cause the electronic device to perform image quality improvement of the image frame acquired by using the first camera module and the at least one image frame acquired by using the second camera module while the video shooting is performed.

6. The electronic device of claim 5, wherein the instructions, when executed by the processor, further cause the electronic device to generate the image corresponding to the request to capture the picture image by synthesizing the image frame acquired by using the first camera module and the at least one image frame acquired by using the second camera module after the image quality improvement is performed.

7. The electronic device of claim 2, wherein the instructions, when executed by the processor, further cause the electronic device to determine whether the image quality improvement is needed, based on at least one of light saturation data, noise data, illuminance data, color data, and subject data.

8. The electronic device of claim 1, wherein the instructions, when executed by the processor, further cause the electronic device to:
based on the second camera module not being available and a current configuration value of the first camera module needing to be changed, acquire one or more image frames using the first camera module by changing the current configuration value of the first camera module, and
improve quality of the picture image based on the acquired one or more image frames.

9. The electronic device of claim 8, wherein the instructions, when executed by the processor, further cause the electronic device to, based on synthesis of the acquired one or more image frames having improved image quality being needed, generate the image through synthesis.

10. A method for operating an electronic device, the method comprising:
performing video shooting by using a first camera module of the electronic device;
receiving a request to capture a picture image while the video shooting is performed by the first camera module;
determining whether a current configuration value of a second camera module of the electronic device needs to be changed, wherein the current configuration value of the second camera module comprises at least one of an exposure value (EV) or a shooting frame number;
based on determining that the current configuration value of the second camera module needs to be changed, changing the current configuration value of the second camera module;
based on the request to capture the picture image, acquiring at least one image frame by using the second camera module of which the current configuration value is changed; and
generating an image corresponding to the request to capture the picture image, based on an image frame acquired by using the first camera module and the at least one image frame acquired by using the second camera module while the video shooting is performed.

11. The method of claim 10, further comprising:
based on the request to capture the picture image, determining whether image quality improvement is needed; and
based on determining that the image quality improvement is needed, acquiring the at least one image frame by using the second camera module.

12. The method of claim 10, further comprising, based on a first focus distance of a first camera lens of the first camera module and a second focus distance of a second camera lens of the second camera module being equal to or greater than a threshold value or a phase difference between the first camera lens of the first camera module and the second camera lens of the second camera module being interpolatable when the first focus distance and the second focus distance are not equal to or greater than the threshold value, generating the image corresponding to the request to capture the picture image, based on the image frame acquired by using the first camera module and the at least one image frame acquired by using the second camera module.

13. The method of claim 10, further comprising, based on a focus distance of a camera lens of each of the first camera module and the second camera module being less than a threshold value and a phase difference between respective camera lenses not being interpolated, configuring the electronic device to use only a portion of image frame data.

14. The method of claim 10, further comprising, performing image quality improvement of the image frame acquired by using the first camera module and the at least one image frame acquired by using the second camera module while the video shooting is performed.

15. The method of claim 14, further comprising, generating the image corresponding to the request to capture the picture image by synthesizing the image frame acquired by using the first camera module and the at least one image frame acquired by using the second camera module after the image quality improvement is performed.

16. The method of claim 10, further comprising:
based on the second camera module not being available and a current configuration value of the first camera module needing to be changed, acquiring one or more image frames using the first camera module by changing the current configuration value of the first camera module; and
improving quality of the picture image based on the acquired one or more image frames.

* * * * *